US006961771B2

(12) United States Patent
Sato (10) Patent No.: US 6,961,771 B2
(45) Date of Patent: Nov. 1, 2005

(54) MULTI-UNIT BUILDING WITH SECURE ENTRY SYSTEM

(75) Inventor: Takayuki Sato, Tokyo (JP)

(73) Assignee: Allied Telesis K.K., Tokyo (JP)

( * ) Notice: Subject to any disclaimer, the term of this patent is extended or adjusted under 35 U.S.C. 154(b) by 461 days.

(21) Appl. No.: 09/682,122

(22) Filed: Jul. 25, 2001

(65) Prior Publication Data

US 2002/0145506 A1 Oct. 10, 2002

(51) Int. Cl.[7] ........................ G06F 15/16; G06F 15/177
(52) U.S. Cl. ........................ 709/225; 709/220; 709/229; 713/201
(58) Field of Search ............................ 340/554, 529; 370/399; 709/225, 229, 238, 220; 713/201; 345/734

(56) References Cited

U.S. PATENT DOCUMENTS

| 4,721,954 A | * | 1/1988 | Mauch ........................ 340/5.54 |
| 4,760,393 A | | 7/1988 | Mauch ........................ 340/825.31 |
| 5,598,456 A | | 1/1997 | Feinberg ..................... 379/42 |

(Continued)

FOREIGN PATENT DOCUMENTS

| AU | 707125 | 9/1997 | ........... G08B/13/00 |
| EP | 1 249 797 A3 | 1/2004 | ........... G07C/9/00 |
| EP | 1 385 127 A1 | 1/2004 | ........... G07B/15/04 |
| JP | 03-275879 | 12/1991 | |
| JP | 2000-124951 | 4/2000 | |
| JP | 2000-259970 | 9/2000 | |
| JP | 2000-315291 A | 11/2000 | ........... G08B/25/04 |
| JP | 2000-332833 | 11/2000 | |
| JP | 2001-036561 | 2/2001 | |
| JP | 2001-053776 | 2/2001 | |
| JP | 2002-070308 A | 3/2002 | ........... G06F/17/60 |
| JP | 2004-013484 A | 1/2004 | ........... G07C/9/00 |
| TW | 304246 | 5/1997 | |
| TW | 326608 | 2/1998 | |
| WO | 02/35479 | 5/2002 | ........... G07C/9/00 |
| WO | 03/036569 A1 | 5/2003 | ........... G07B/15/04 |

OTHER PUBLICATIONS

Author unknown, White Paper; Virtual LAN Communications, Cisco Systems, Inc., 1995, 14 pages.*
Author unknown, Virtual LANs; Flexible network segmentation for high–speed LANs, Intel, 1997, 8 pages including coversheet.*
Copy of Written Opinion (mailed May 5, 2004).
Smith, et al., "*Integrating Physical and Computer Access Control Systems,*" IEEE pp. 176–179 (1994).
An penzeller, et al., "*User–Friendly Access Control for Public Network Ports,*" IEEE, pp. 699–707 (1999). European Search Report (Dec. 10, 2003).
Copy of Taiwanese Office Action (with English Translation).
Copy of Japanese Office Action (with English Translation).
(No Translation) Advanced Network Construction to Realize Gigabit Ethernet Environment (1991).

*Primary Examiner*—Patrice Winder
(74) *Attorney, Agent, or Firm*—John J. Penny, Jr.; Edwards & Angell, LLP (57) ABSTRACT

A secure entry system for a building having a plurality of units provided therein, each of the units permitting only entry of a designated person thereto, the system comprising: an administration server operable to administrate a computer network system in the building; and at least one interconnecting device operable to connect the administration server and respective network devices in the plurality of units. The administration server sets the interconnecting device to assign a plurality of VLANs to each of the units, respectively, in such a manner that a VLAN assigned to one of the units is different from VLANs assigned to respective others of the units to provide secure entry to the units and the computer network system in the building.

20 Claims, 6 Drawing Sheets

U.S. PATENT DOCUMENTS

| | | | |
|---|---|---|---|
| 5,805,801 A | * 9/1998 | Holloway et al. | 713/201 |
| 5,874,964 A | * 2/1999 | Gille | 345/734 |
| 5,884,024 A | 3/1999 | Lim et al. | 395/187.01 |
| 5,905,859 A | 5/1999 | Holloway et al. | 395/187.01 |
| 5,914,938 A | 6/1999 | Brady et al. | 370/254 |
| 5,968,126 A | * 10/1999 | Ekstrom et al. | 709/225 |
| 5,968,176 A | * 10/1999 | Nessett et al. | 713/201 |
| 6,047,325 A | * 4/2000 | Jain et al. | 709/238 |
| 6,167,052 A | * 12/2000 | McNeill et al. | 370/399 |
| 6,204,760 B1 | * 3/2001 | Brunius | 340/529 |
| 2002/0145506 A1 | 10/2002 | Sato | 340/5.7 |

* cited by examiner

FIG. 1

| CLOSED SPACE | CLOSED-SPACE IDENTIFYING INFORMATION | VLAN IDENTIFYING INFORMATION |
|---|---|---|
| 101 | ABCDE | 87326 |
| 102 | FGHIJ | 75981 |
| 201 | LMNOP | 67125 |
| 202 | QRSTU | 66719 |
| ⋮ | ⋮ | ⋮ |

| CLOSED SPACE | USER ID | PASSWORD | MAC ADDRESS |
|---|---|---|---|
| 101 | aaaaa | ***** | 50-22-37-AB-66-83 |
| 102 | bbbbb | ***** | 33-51-86-CD-76-10 |
| 201 | ccccc | **** | 55-01-27-EF-60-11 |
| 202 | ddddd | ***** | 61-00-10-GF-51-20 |
| | eeee | ***** | 53-11-02-HI-12-35 |
| ⋮ | ⋮ | ⋮ | ⋮ |

MULTI-UNIT BUILDING WITH SECURE ENTRY SYSTEM

CROSS REFERENCE TO RELATED APPLICATIONS

This patent application claims priority from a Japanese patent application, 2001-109776 filed on Apr. 9, 2001, the contents of which are incorporated herein by reference.

BACKGROUND OF INVENTION

1. Field of the Invention

The present invention relates to security for a collective building, i.e., a multi-unit building. More particularly, the present invention relates to a collective building having a high-security computer network system configured therein with an administration server for administrating entry to multiple units in the building and to the computer network system for ensuring security therein.

2. Description of the Related Art

An apartment house administration system has been developed in which a LAN (local area network) is configured by installing a line concentrator, such as a router or a hub, in the apartment house. According to the conventional apartment house administration system, each dwelling unit is made secure against other dwelling units in the apartment house and against the outside of the LAN by administrating the line concentrator provided in the apartment house by means of an administration server connected thereto via the Internet.

However, according to the conventional apartment house administration system, it is hard to keep the LAN secure against outsiders because the LAN is administrated by the administration server connected to the LAN through the Internet. Moreover, it is difficult for the administration server connected to the LAN through the Internet to maintain detailed administration of network devices used in the respective dwelling units.

SUMMARY OF INVENTION

Therefore, it is an object of the present invention to provide a secure entry system for multi-unit building and a multi-unit building with secure entry system, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, a secure entry system for a building having a plurality of units provided therein, each of the units permitting only entry of a designated person thereto, the system comprising: an administration server, which is provided in said building, operable to administrate a computer network system in the building; and at least one interconnecting device operable to connect the administration server and respective network devices in the plurality of units, wherein the administration server sets the interconnecting device to assign a plurality of VLANs to each of the units, respectively, in such a manner that a VLAN assigned to one of the units is different from VLANs assigned to respective others of the units to provide secure entry to the units and the computer network system in the building.

The secure entry system may further comprise a user certifying unit operable to obtain identifying information of a person trying to enter one of the units in the building from the person to certify whether or not the person is a designated person based on the identifying information and to permit only the designated person to enter one of the units in the building.

The administration server may administrate an entry of a user of each of the units to each of the units and an entry of one of the respective network devices by the user to the computer network system.

The administration server may assign closed-space identifying information to each of the plurality of units, the closed-space identifying information being information for identifying a corresponding one of the plurality of units, and each of the plurality of units permits the user having the closed-space identifying information assigned to each of the units to enter the corresponding one of each of the plurality of units.

The administration server may assign VLAN identifying information to each of the VLANs respectively assigned to the plurality of units, the VLAN identifying information being information for identifying a corresponding one of the VLANs, and the administration server permits one of the network devices that sent the VLAN identifying information assigned to one of the VLANs identified by the sent VLAN identifying information, to enter the computer network system.

The administration server may store a history of the entry of the user of each of the units to each of the units and a history of the entry of one of the network devices by the user to the computer network system.

The administration server may assign the plurality of VLANs to the units, respectively, to be different from a further VLAN assigned to the administration server.

The administration server may assign further VLAN, which is assigned to the administration server, to the interconnecting device.

The administration server may obtain at least one of a communication amount and a communication time period for each connection port of the interconnecting device, and controls communication at each connection port of the interconnecting device based on at least one of the communication amount and the communication time period.

The secure entry system may further comprise an entrance server operable to administrate an entry of each of the network devices in the plurality of units to the computer network system.

The entrance server may have an entrance database operable to store device identifying information for identifying each of the network devices, and permits a corresponding one of the network devices that has the device identifying information stored in the entrance database to enter the computer network system.

The entrance database may store a MAC address of each of the network devices as the device identifying information, and the entrance server permits one of the network devices that has the MAC address stored in the entrance database to enter the computer network system.

The secure entry system may further comprise a DHCP server operable to assign, in a case where it is determined that the MAC address of one of the network devices is stored in the entrance database, an IP address to one of the network devices.

The entrance server may have an entrance database operable to store user identifying information for identifying a corresponding user of each of the network devices, and permits a corresponding one of the network devices that sent the user identifying information stored in the entrance database to enter the computer network system.

The administration server may assign, to the entrance server, a VLAN that allows the entrance server to communicate with the plurality of VLANs respectively assigned to the plurality of units.

The secure entry system may further comprise a shared server operable to give a plurality of the network devices common information that is common thereto, each of the plurality of units having therein at least one of the plurality of network devices.

The administration server may assign, to the shared server, a VLAN that allows the shared server to communicate with the plurality of VLANs respectively assigned to the plurality of units.

The secure entry system may further comprise a DHCP server operable to assign an IP address to each of the respective network devices in the plurality of units.

The administration server may assign, to the DHCP server, a VLAN that allows the DHCP server to communicate with the plurality of VLANs respectively assigned to the plurality of units.

Each of the units may include an abnormal-state detecting unit operable to detect an abnormal state in a corresponding one of each of the units and to notify the administration server of a detection thereof, the abnormal-state detecting unit being connected to a connection port of the interconnecting device other than a connection port to which one of the network devices is connected.

According to the second aspect of the present invention, a multi-unit building having a secure entry system for a plurality of closed spaces provided therein, each of the closed spaces limiting access thereto to an insider of the closed space, the building comprising: an administration server that administrates a computer network system in the building; and an interconnecting device that connects the administration server and a plurality of network devices in the plurality of closed spaces, wherein each of the plurality of closed spaces has a corresponding VLAN assigned thereto based upon the administration server setting the interconnecting device such that each VLAN assigned to the plurality of closed spaces is different from respective other VLANs assigned to others of the closed spaces; and the administration server limits access to each of the plurality of closed spaces and the computer network system in the building to a designated insider.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION

The invention will now be described based on the preferred embodiments, which do not intend to limit the scope of the present invention, but exemplify the invention. All of the features and the combinations thereof described in the embodiment are not necessarily essential to the invention.

Figure 1:
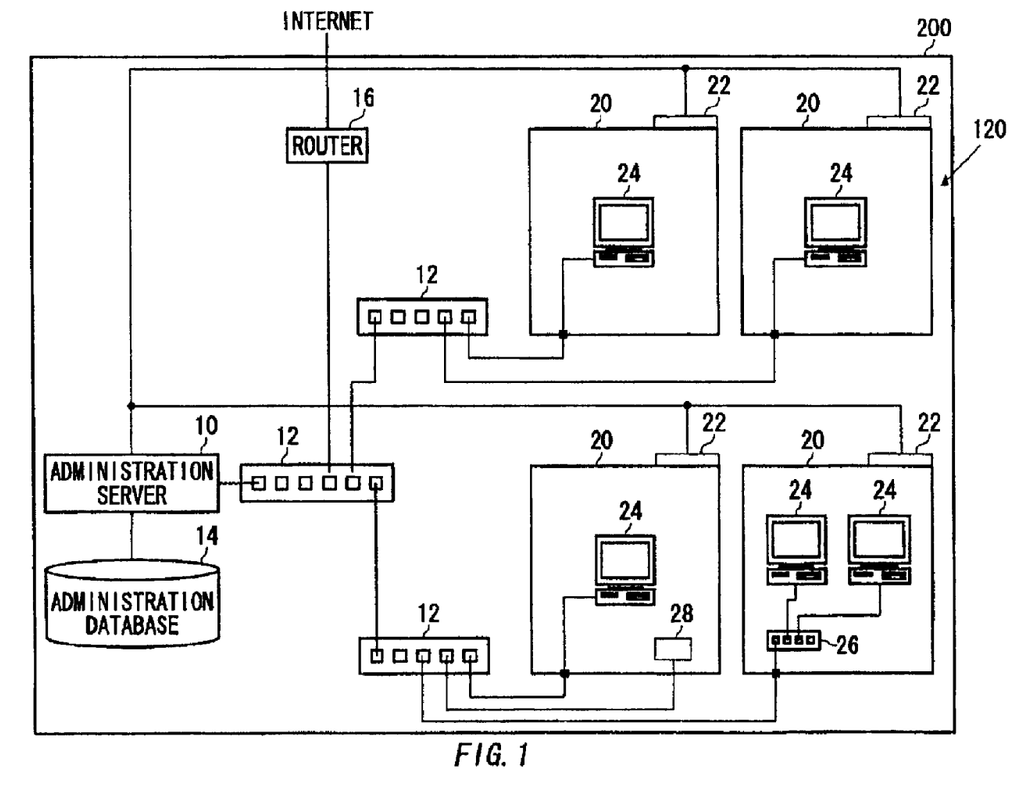
FIG. 1 shows a structure of a collective building according to an embodiment of the present invention.

FIG. 1 shows a structure of a collective building 200 according to an embodiment of the present invention. The collective building 200 of the present embodiment is provided with a plurality of closed spaces or units 20 each of which only is accessible by an insider, that is, a designated person who belongs thereto. The collective building 200 includes an administration server 10 that generally administrates a computer network system 120 of the collective building 200 and one or more interconnecting devices 12 for connecting the administration server 10 to at least one network device 24 used in a corresponding closed space 20.

The collective building 200 further includes a router 16 that can connect the computer network system 120 of the collective building 200 to the Internet. The network device 24 can use the Internet via the router 16. An administration apparatus provided on the Internet may administrate the administration server 10 and an administration database 14.

The administration server 10 performs the setting of each interconnecting device 12 so as to assign respective, different VLANs (virtual local area networks) to the closed spaces 20. Each closed space 20 includes a user certifying unit 22 that certifies a user who tries to enter the closed space 20. The closed space 20 may also include a line concentrator 26, such as a router or a hub, and a plurality of network devices 24 connected to the line concentrator 26 in the closed space 20 may be connected to the computer network system 120.

The administration server 10 assigns, to each of the closed spaces 20, closed-space identifying information for identifying the corresponding closed space 20. The administration server 10 also assigns VLAN identifying information that identifies the VLAN to each of the VLANs respectively assigned to the closed spaces 20. Moreover, the administration server 10 has the administration database 14 that stores, for each of the closed spaces 20, the closed-space identifying information and the VLAN identifying information so as to correspond to the associated closed space 20.

The administration server 10 administrates the entry of the user of the closed space 20 to the closed space 20 and the entry of the network device 24 to the computer network system 120 by the user. The user certifying unit 22 certifies the closed-space identifying information of the user based on data stored in the administration database 14, so as to only allow the user having the closed-space identifying information of the corresponding closed space 20, i.e., a designated user, to enter the corresponding closed space 20.

The administration server 10 certifies the VLAN identifying information sent from the network device 24 in each closed space 20 based on data stored in the administration database 14, and only allows the network device 24 that sends the VLAN identifying information specifying the VLAN assigned to that closed space 20, i.e., a designated user, to enter the computer network system 120.

The administration server 10 may store a history of the entry of the user of the closed space 20 to that closed space 20 and a history of the entry of the network device 24 by the user to the computer network system 120. In this case, the administration server 10 can detect improper entry to each of the closed spaces 20 and improper entry to the computer network system 120.

Each closed space 20 may include an abnormal-state detecting unit 28 that can detect an abnormal state, such as a fire, gas leakage occurring in the closed space 20, or the like. The abnormal-state detecting unit 28 is connected to the administration server 10 via the interconnecting device 12 so as to notify the administration server 10 of a detected abnormal state. The administration server 10 notifies the administrator of the building 200, a security-service company or the like, of the occurrence of the abnormal state. It is preferable that the abnormal-state detecting unit 28 is connected to a connection port of the interconnecting device 12 other than the connection port thereof to which the network device 24 in the corresponding closed space 20 is connected. In this case, it is possible to prevent a wrong operation of the abnormal-state detecting unit 28 from being caused by a wrong operation of the network device 24.

The user certifying unit 22 may obtain, from a person trying to enter the corresponding closed space 20, identifying information of the person so as to determine whether or not the person is an insider of the corresponding closed space 20 based on the obtained identifying information, thereby permitting only the entry of the insider of the corresponding closed space 20 to the closed space 20. The user certifying unit 22 may be a device such as a lock provided on an entrance of the closed space 20 while the closed-space identifying information may be a corresponding, unique shape of a key for opening/closing the lock. The lock may certify or verify the shape of the key presented by the user of the closed space 20 so as to allow, in a case where the shape of the key is successfully certified, the user having the certified key to enter the closed space 20.

The administration server 10 may be provided in an administration-closed space (not shown), for example, a room for a janitor of the collective building 200. The administration-closed space may include a user certifying unit 22 that certifies a user who tries to enter the administration-closed space, and the administration server 10 may limit entry to the administration-closed space based on data previously stored in the administration database 14.

According to the collective building 200 of the present embodiment, high security can be realized against improper entry by unauthorized persons to the computer network system 120 by limiting the entry of a user to the closed space 20 and limiting the entry of a network device 24 to the computer network system 200.

Figure 2:
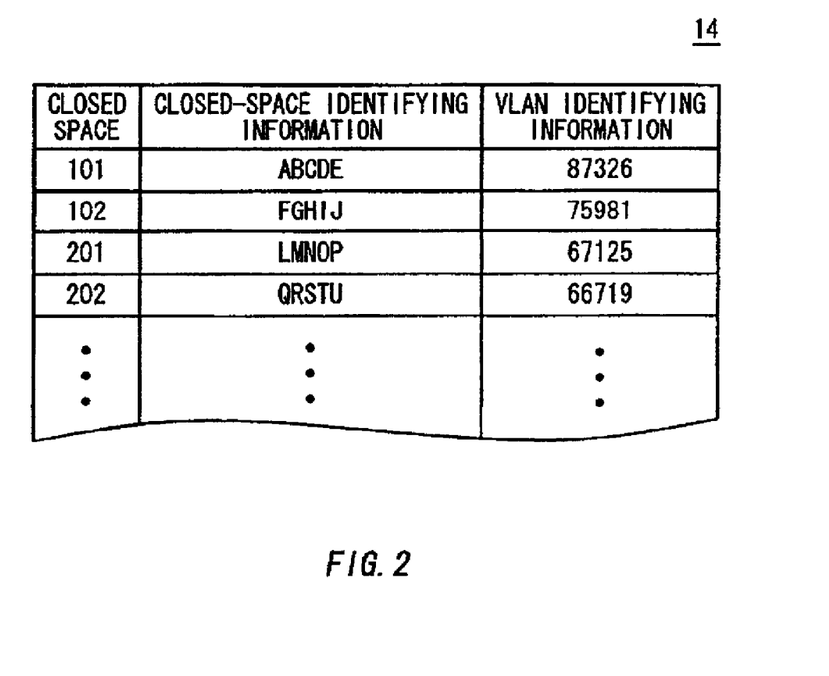
FIG. 2 shows an exemplary data format of an administration information file stored in an administration database.

FIG. 2 shows an exemplary data format of an administration information file stored in the administration database 14. The administration information file includes fields of closed space, closed-space identifying information and VLAN identifying information. The closed space field stores information for identifying a corresponding closed space 20. The closed-space identifying information field is assigned to each closed space 20 and stores the closed-space identifying information for certifying a user of the corresponding closed space 20. The VLAN identifying information field is assigned to each VLAN in the closed space 20 and stores the VLAN identifying information for certifying a user of the corresponding VLAN. Based on data stored in the administration database 14, the administration server 10 administrates the entry of the user of the closed space 20 to the closed space 20 and the entry of the network device 24 by the user to the computer network system 120.

Figure 3:
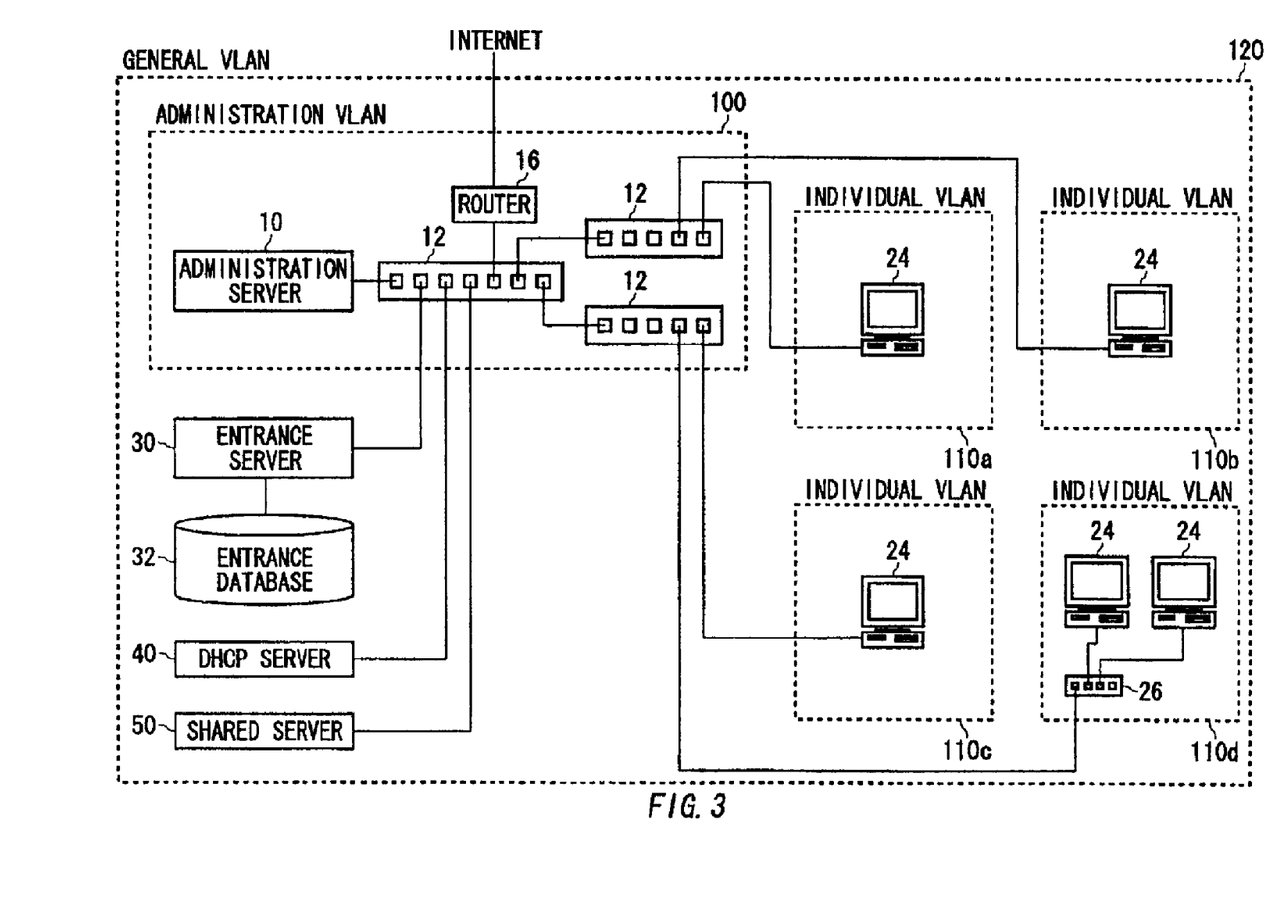
FIG. 3 shows a structure of a computer network system configured in the collective building according to the embodiment of the present invention.

FIG. 3 illustrates a structure of a computer network system 120 of the collective building 200 according to the present embodiment. The computer network system 120 of the collective building 200 includes an entrance server 30 that administrates access of the network devices 24 used in the closed spaces 20 to the computer network system 120; a DHCP (Dynamic Host Configuration Protocol) server 40 that assigns an IP address to each of the network devices 24 used in the closed spaces 20; and a shared server 50 that can give the network devices 24 used in each of the closed spaces 20 information common thereto.

The administration server 10 assigns an administration VLAN 100 to the administration server 10. The administration server 10 also assigns the same administration VLAN 100 as that assigned to the administration server 10 to the interconnecting devices 12. Thus, the administration server 10 manages the interconnecting devices 12 in the administration VLAN 100 and can perform the VLAN settings in the connection ports of the interconnecting devices 12.

The administration server 10 assigns individual VLANs 110a, 110b, 110c and 110d that are different from the administration VLAN 100 to the network devices 24 in a plurality of closed spaces 20 in such a manner that a VLAN assigned to each closed space 20 is different from the respective VLANs assigned to other closed spaces 20. Thus, the administration server 10 cannot communicate with the network devices 24 used in the closed spaces 20. Also, the network device 24 used in a certain closed space 20 cannot communicate with another network device 24 used in another closed space 20. Moreover, the administration server 10 assigns to the entrance server 30, the DHCP server 40 and the shared server 50 a general VLAN 120 that allows the servers 30, 40 and 50 to communicate with the individual VLANs 110a, 110b, 110c and 110d respectively assigned to the closed spaces 20.

The administration server 10 obtains at least one of the communication amount and the communication time period for each of the connection ports of the interconnecting devices 12.

Based on the at least one of the communication amount and the communication time period thus obtained, the administration server 10 controls the communication at the corresponding connection port of the interconnecting devices 12. The administration server 10 may create charging information based on the at least one of the communication amount and the communication time period obtained to charge the user the communication cost. By controlling the communication at each connection port of the interconnecting devices 12, the administration server 10 can limit connection to the Internet by the network device 24 connected to that connection port of the interconnecting devices 12, or the like.

The entrance server 30 includes an entrance database 32 that stores device identifying information which is information for identifying the network devices 24. The entrance database 32 stores an MAC address as an example of the device identifying information. The entrance server 30 permits the entry of the network device 24 having the MAC address stored in the entrance database 32 to the computer network system 120. The user of the network device 24 logs in the entrance server 30 by using the network device 24, and registers the MAC address of the network device 24 into the entrance database 32. Alternatively, an administrator of the entrance server 30 may register the MAC address of the network device 24 by using the entrance server 30.

The entrance database 32 may store the user identifying information which is information for identifying the user of the network device 24. Based on the user identifying information stored in the entrance database 32, the entrance server 30 may certify or verify the user identifying information sent from the network device 24. Moreover, in a case where the user is successfully certified, the entrance server 30 may store the MAC address of the network device 24 that sent the certified user identifying information, in the entrance database 32. The entrance server 30 may permit the entry of the network device 24 that sent the certified user identifying information, to the computer network system 120.

The DHCP server 40 may assign an IP address to the network device 24 having the MAC address stored in the entrance database 32. By assigning the IP address only to the network device 24 registered in the entrance database 32 by means of the DHCP server 40, only the registered network device 24 can use the Internet through the computer network system 120.

Figure 4:
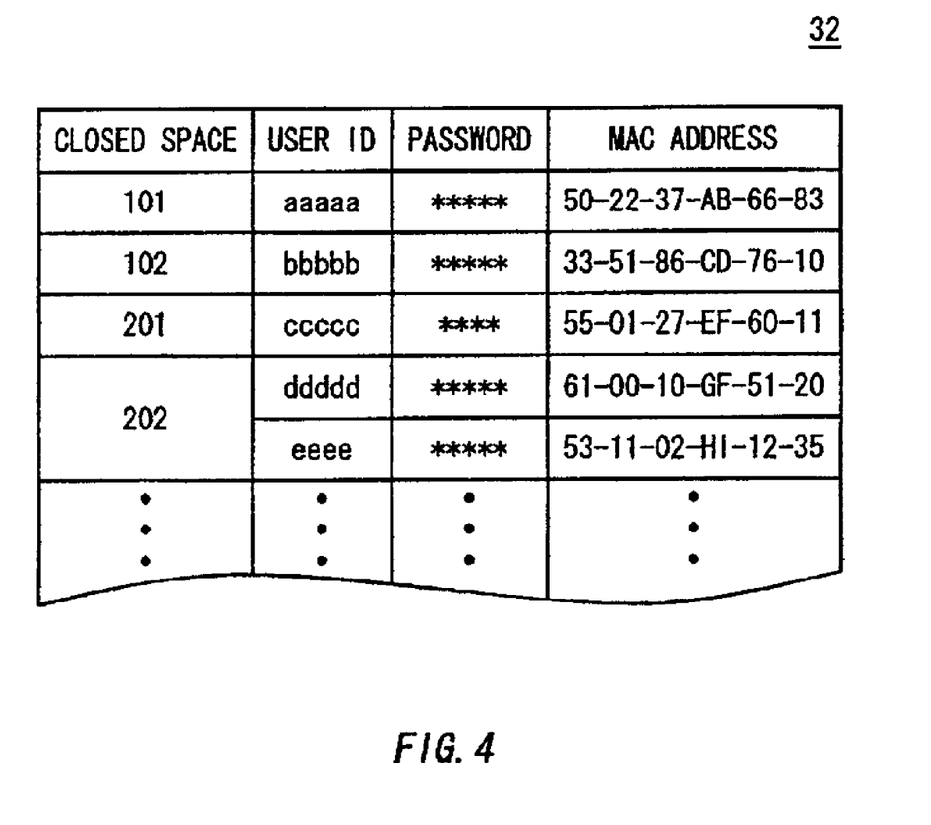
FIG. 4 shows an exemplary data format of an entrance file stored in an entrance database.

FIG. 4 shows an exemplary data format of an entrance file stored in the entrance database 32. The entrance file includes fields of closed space, user ID, password and MAC address. The closed space field stores information for identifying corresponding closed spaces 20. The user ID field stores the user identifying information for identifying the corresponding user of the network device 24. The password field stores a corresponding password used for certifying the user identified by the user identifying information stored in the associated user ID field. The MAC address field stores the MAC address of the network device 24 used in the corresponding closed space 20.

The user identifying information to be stored in the user ID field and the password to be stored in the password field are registered in advance by the user of the network device 24 or by the network administrator. As the MAC address to be stored in the MAC address field, the MAC address received from the network device 24 is stored. The user of the network device 24 logs in the entrance server 30 by using the network device 24 and inputs the user ID and the password of the user. The entrance server 30 certifies the user ID and the password thus input by using the user identifying information and the password stored in the user ID field and the password field, respectively, and thereafter stores the received MAC address of the network device 24 that sent the user ID and the password.

The entrance database 32 stores the MAC address so as to correspond to the associated closed space 20. The entrance server 30 only permits the entry of the network device 24 having the MAC address that corresponds to a certain closed space 20 to the computer network system 120.

Figure 5:
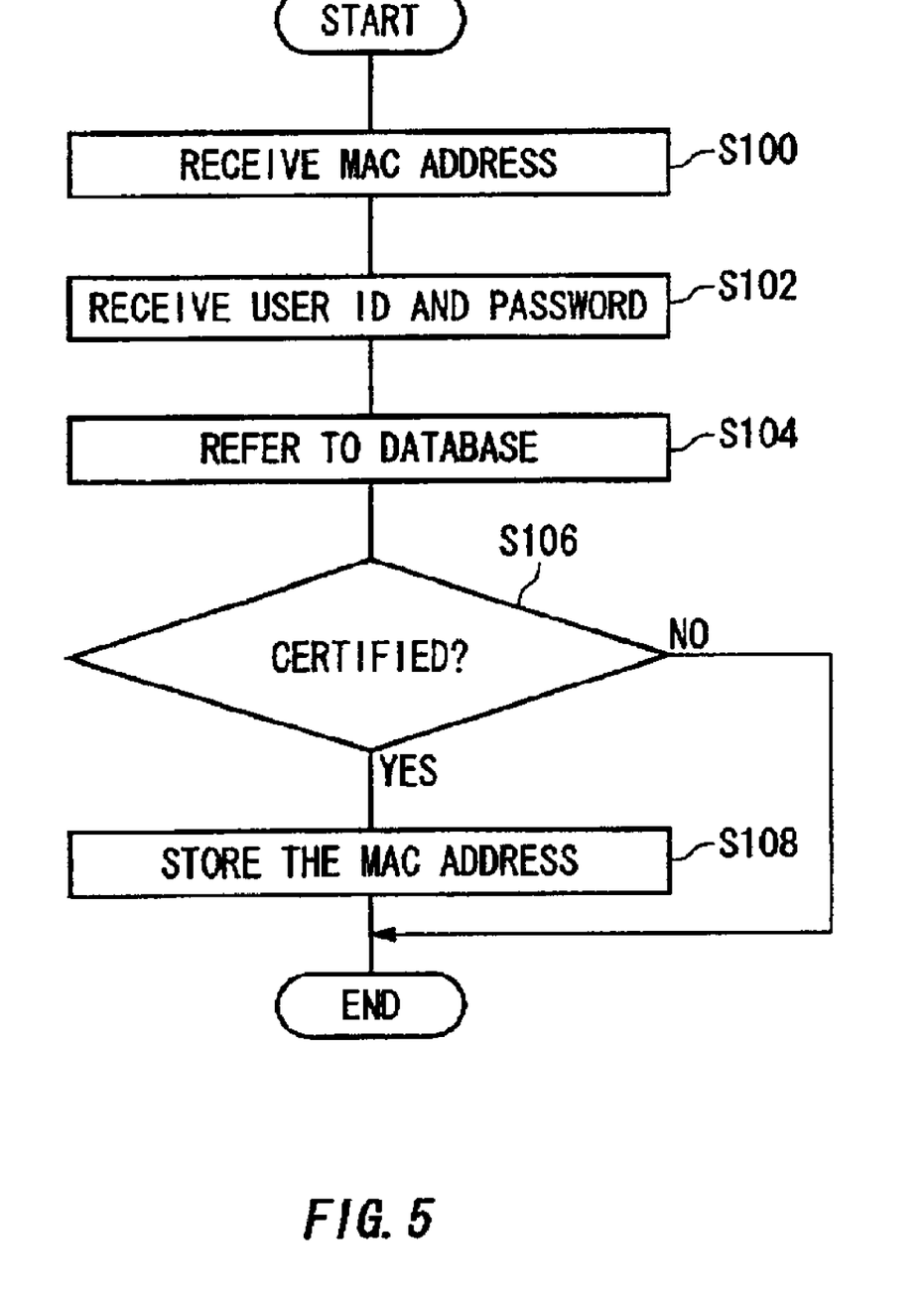
FIG. 5 is a flowchart of an MAC address registration operation.

FIG. 5 is a flowchart of a MAC address registration operation. First, the entrance server 30 receives the MAC address of the network device 24 connected to the interconnecting device 12 from the interconnecting device 12 (Step S100). The entrance server 30 then receives the user ID and the password input by the user into the network device 24 that logs in the entrance server 30 (Step S102). Then, the entrance server 30 refers to the entrance database 32 (Step S104), so as to certify the user ID and the password received (Step S106). In a case where the user ID and the password are not certified in Step S106, the entrance server 30 finishes the MAC address registration operation. In a case where the user ID and the password are successfully certified in Step SI 06, the entrance server 30 registers the received MAC address into the entrance database 32 (Step S108).

Figure 6:
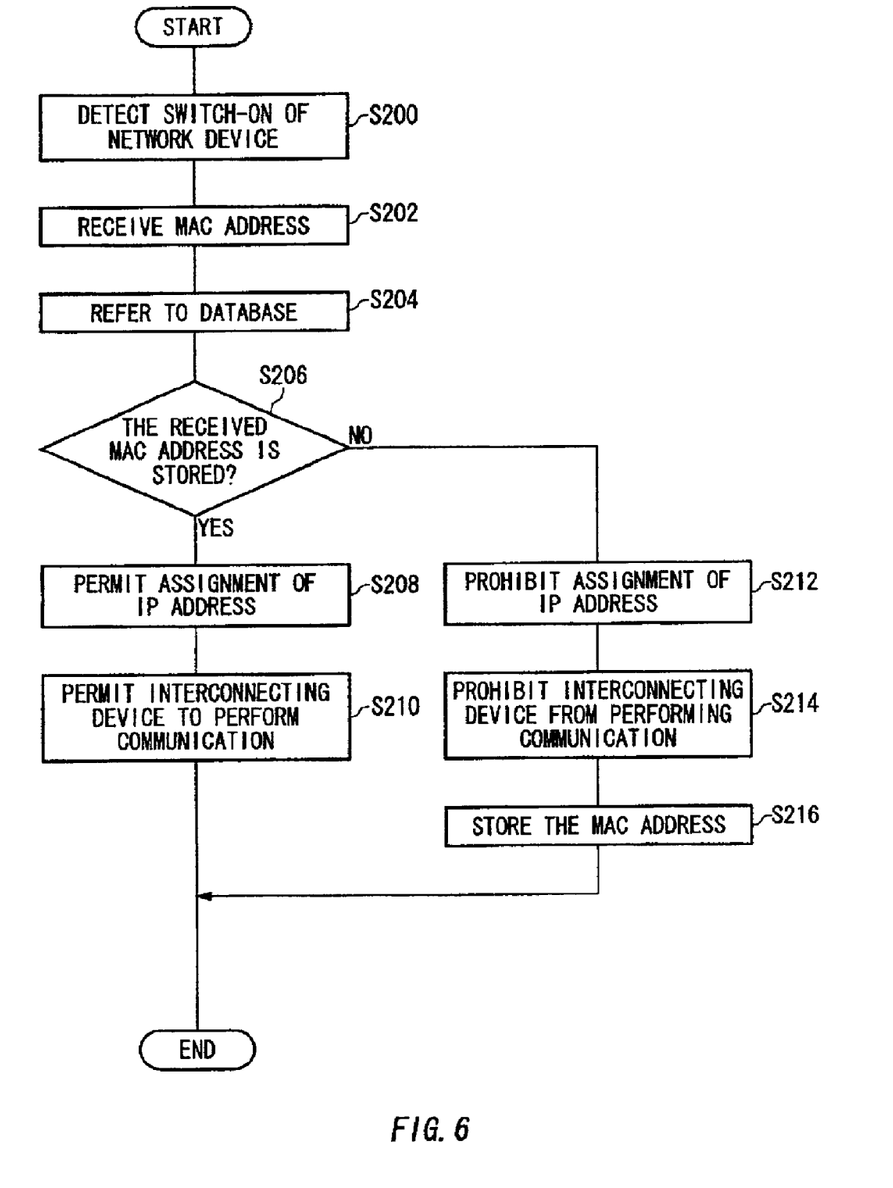
FIG. 6 is a flowchart of an MAC address verifying operation.

FIG. 6 is a flowchart of a MAC address verifying operation. First, the interconnecting device 12 detects that the network device 24 connected to the interconnecting device 12 is turned on, and then notifies the entrance server 30 of the detection result (Step S200). Then, the entrance server 30 receives, from the interconnecting device 12, the MAC address of the network device 24 connected to the interconnecting device 12 (Step S202). The entrance server 30 then refers to the entrance database 32 (Step S204), so as to determine whether or not the received MAC address is stored in the entrance database 32 (Step S206).

In a case where the received MAC address is stored in the entrance database 32, the entrance server 30 permits the DHCP server 40 to assign an IP address to the network device 24 having the received MAC address (Step S208). The DHCP server 40 then assigns the IP address to the network device 24 based on the instruction from the entrance server 30. The entrance server 30 also permits the interconnecting device 12 to perform communication at the connection port of the interconnection device 12, to which the network device 24 having the received MAC address is connected (Step S210).

In a case where the received MAC address is not stored in the entrance database 32, the entrance server 30 prohibits the DHCP server 40 from assigning an IP address to the network device 24 having the received MAC address (Step S212). The entrance server 30 also prohibits the interconnecting device 12 from performing the communication at the connection port of the interconnecting device 12, to which the network device 24 having the received MAC address is connected (Step S214). Moreover, the entrance server 30 determines that the network device 24 having the received MAC address has attempted improper entry to the computer network system 120, and stores the received MAC address therein (Step S216). The entrance server 30 may notify the administrator of the attempted improper entry of the network device 24 to the computer network system 120.

According to the collective building 200 of the present embodiment, by providing the collective building 200 with the administration server 10, the entrance server 30, the DHCP server 40, and the shared server 50, it is possible to perform detailed, secure administration of the interconnecting devices 12 and the network devices 24. Moreover, a secure computer network system can be configured in a multi-unit building by administrating the interconnecting devices 12 and the network devices 24 without using the Internet. Furthermore, since a network device 24 that can use the computer network system according to the present invention is limited based on the registered MAC address of the network device 24, improper entry to the computer network system can be prevented.

As is apparent from the above, according to the present invention, a collective building having a computer network system with high security configured therein can be provided by providing the collective building with an administration server for administrating secure access to units in the building and to the computer network system of the building.

Although the present invention has been described by way of exemplary embodiments, it should be understood that those skilled in the art might make many changes and substitutions without departing from the spirit and the scope of the present invention which is defined only by the appended claims.

What is claimed is:

1. A secure entry system for a building having a plurality of units provided therein, each of said units permitting only entry of a designated person thereto, said system comprising:
    an administration server, which is provided in said building, operable to administrate a computer network system in said building; and
    at least one interconnecting device operable to connect said administration server and respective network devices in said plurality of units, wherein said administration server sets said interconnecting device to assign a plurality of VLANs to each of said units, respectively, in such a manner that a VLAN assigned to one of said units is different from VLANs assigned to respective others of said units to provide secure entry to said units and said computer network system in the building, wherein said administration server administrates an entry of a user of each of said units to said each of said units and an entry of one of said respective network devices by said user to said computer network system.

2. A secure entry system for a building as claimed in claim 1, further comprising a user certifying unit operable to obtain identifying information of a person trying to enter one of said units in the building from said person to certify whether or not said person is a designated person based on said identifying information and to permit only said designated person to enter said one of said units in the building.

3. A secure entry system for a building as claimed in claim 1, wherein said administration server assigns closed-space identifying information to each of said plurality of units, said closed-space identifying information being information for identifying a corresponding one of said plurality of units, and each of said plurality of units permits said user having said closed-space identifying information assigned to said each of said units to enter said corresponding one of each of said plurality of units.

4. A secure entry system for a building as claimed in claim 1, wherein said administration server assigns VLAN identifying information to each of said VLANs respectively assigned to said plurality of units, said VLAN identifying information being information for identifying a corresponding one of said VLANs, and
    said administration server permits one of said network devices that sent said VLAN identifying information assigned to one of said VLANs identified by said sent VLAN identifying information, to enter said computer network system.

5. A secure entry system for a building as claimed in claim 1, wherein said administration server stores a history of the entry of said user of said each of said units to said each of said units and a history of the entry of said one of said network devices by said user to said computer network system.

6. A secure entry system for a building as claimed in claim 1, wherein said administration server assigns said plurality of VLANs to said units, respectively, to be different from a further VLAN assigned to said administration server.

7. A secure entry system for a building as claimed in claim 6, wherein said administration server assigns said further VLAN, which is assigned to said administration server, to said interconnecting device.

8. A secure entry system for a building as claimed in claim 1, wherein said administration server obtains at least one of a communication amount and a communication time period for each connection port of said interconnecting device, and controls communication at said each connection port of said interconnecting device based on said at least one of said communication amount and said communication time period.

9. A secure entry system for a building as claimed in claim 1, further comprising an entrance server operable to administrate an entry of each of said network devices in said plurality of units to said computer network system.

10. A secure entry system for a building as claimed in claim 9, wherein said entrance server has an entrance database operable to store device identifying information for identifying each of said network devices, and permits a corresponding one of said network devices that has said device identifying information stored in said entrance database to enter said computer network system.

11. A secure entry system for a building as claimed in claim 10, wherein said entrance database stores a MAC address of said each of said network devices as said device identifying information, and
    said entrance server permits said one of said network devices that has said MAC address stored in said entrance database to enter said computer network system.

12. A secure entry system for a building as claimed in claim 11, further comprising a DHCP server operable to assign, in a case where it is determined that said MAC address of said one of said network devices is stored in said entrance database, an IP address to said one of said network devices.

13. A secure entry system for a building as claimed in claim 9, wherein said entrance server has an entrance database operable to store user identifying information for identifying a corresponding user of said each of said network devices, and permits a corresponding one of said network devices that sent said user identifying information stored in said entrance database to enter said computer network system.

14. A secure entry system for a building as claimed in claim 9, wherein said administration server assigns, to said entrance server, a VLAN that allows said entrance server to communicate with said plurality of VLANs respectively assigned to said plurality of units.

15. A secure entry system for a building as claimed in claim 1, further comprising a shared server operable to give a plurality of said network devices common information that is common thereto, each of said plurality of units having therein at least one of said plurality of network devices.

16. A secure entry system for a building as claimed in claim 15, wherein said administration server assigns, to said shared server, a VLAN that allows said shared server to communicate with said plurality of VLANs respectively assigned to said plurality of units.

17. A secure entry system for a building as claimed in claim 1, further comprising a DHCP server operable to assign an IP address to each of said respective network devices in said plurality of units.

18. A secure entry system for a building as claimed in claim 17, wherein said administration server assigns, to said DHCP server, a VLAN that allows said DHCP server to communicate with said plurality of VLANs respectively assigned to said plurality of units.

19. A secure entry system for a building as claimed in claim 1, wherein each of said units includes an abnormal-state detecting unit operable to detect an abnormal state in a corresponding one of said each of said units and to notify said administration server of a detection thereof, said abnormal-state detecting unit being connected to a connection port of said interconnecting device other than a connection port to which one of said network devices is connected.

20. A multi-unit building having a secure entry system for a plurality of closed spaces provided therein, each of said closed spaces limiting access thereto to an insider of said closed space, said building comprising:

an administration server that administrates a computer network system in said building; and an interconnecting device that connects said administration server and a plurality of network devices in said plurality of closed spaces, wherein each of said plurality of closed spaces has a corresponding VLAN assigned thereto based upon said administration server setting said interconnecting device such that each VLAN assigned to said plurality of closed spaces is different from respective other VLANs assigned to others of said closed spaces; and said administration server limits access to said each of said plurality of closed spaces and said computer network system in the building to a designated insider, wherein said administration server administrates an entry of a user of each of said closed spaces to said each of said closed spaces and an entry of one of said plurality of network devices by said user to said computer network system.

* * * * *